United States Patent [19]

Kille et al.

[11] Patent Number: 4,551,037

[45] Date of Patent: Nov. 5, 1985

[54] DEVICE FOR APPLYING PAINT WITH RECIPROCATING LINEAR MOTOR

[75] Inventors: Ewald Kille, Friedrichshafen, Fed. Rep. of Germany; Rudolf Karliner, Minnetonka, Minn.

[73] Assignee: J. Wagner GmbH, Fed. Rep. of Germany

[21] Appl. No.: 501,253

[22] Filed: Jun. 6, 1983

[30] Foreign Application Priority Data

Jun. 16, 1982 [DE] Fed. Rep. of Germany ....... 3222595

[51] Int. Cl.[4] ........................ B05C 17/02; H02K 41/02

[52] U.S. Cl. .................................... 401/146; 401/149; 401/150; 401/188 R; 310/16; 417/416; 417/417

[58] Field of Search ........... 401/146, 149, 150, 188 R; 417/416, 417; 310/16

[56] References Cited

U.S. PATENT DOCUMENTS

| | | | |
|---|---|---|---|
| 864,990 | 9/1907 | Richards et al. | 417/416 |
| 1,965,631 | 7/1934 | Disch | 401/149 X |
| 2,704,690 | 3/1955 | Eichenauer . | |
| 3,172,121 | 3/1965 | Doyle et al. | 310/16 |
| 3,514,228 | 5/1970 | Toyoda | 417/416 |
| 3,554,659 | 1/1971 | Stokes . | |
| 3,681,630 | 8/1972 | Sutton | 310/16 |
| 4,072,429 | 2/1978 | Terzian et al. | 401/146 |
| 4,090,816 | 5/1978 | Takahasi . | |
| 4,278,406 | 7/1981 | Cooperrider | 417/417 X |

FOREIGN PATENT DOCUMENTS

| | | | |
|---|---|---|---|
| 1449554 | 1/1967 | France | 401/149 |

OTHER PUBLICATIONS

Wagner Brochure Entitled "Uberzeugend" and English Translation.

*Primary Examiner*—Steven A. Bratlie

*Attorney, Agent, or Firm*—Hill, Van Santen, Steadman & Simpson

[57] ABSTRACT

A compact portable, easily operated, paint applying apparatus has a frame adapted to rest on the ground, a lifting handle on the frame for ease in carrying to use locations, a paint reservoir removably supported in upright position on the frame, an electric motor driven paint pump mounted on the frame above the reservoir, an intake tube depending from said pump into the reservoir, a discharge tube extending from the pump, and a paint applicator supplied by the discharge tube. The frame is preferably L-shaped with a bottom horizontal leg provided a sturdy base and an upright vertical leg. The horizontal leg has a well receiving the paint reservoir, the vertical leg has a recess receiving the rear end of a housing in which a reciprocal electric motor is mounted. The front end of the motor housing mounts a pump housing with a depending intake coupling directly over the paint reservoir on the horizontal base and an outlet coupling on the front end thereof. The intake coupling is attached to a short tube extending to the bottom of the reservoir while the outlet coupling is attached to a flexible hose or tube leading to the end of a handle with a trigger operated valve discharging into a wand which feeds the paint applying device such as a paint roller or a spray head discharging onto the roller.

17 Claims, 6 Drawing Figures

DEVICE FOR APPLYING PAINT WITH RECIPROCATING LINEAR MOTOR

BACKGROUND OF THE INVENTION

1. Field of the Invention

This invention relates to the art of paint applicators and particularly deals with a portable easily manipulated base frame mounting a paint reservoir and an electromatic motor reciprocating a piston pump above the reservoir having an intake depending into the reservoir and a high pressure flexible hose discharging to a hand operated valve on the handle of the hollow wand of a paint roller discharging the paint into or onto the roller.

2. Prior Art

Portable paint spray guns having diaphragm pumps discharging to spray nozzles and carrying a paint reservoir are known, but these devices are noisy, difficult to manipulate in small spaces and contaminate the surroundings with paint mist. It would therefore be an improvement in the art to provide a device for applying paint which is quiet in operation, simple to manipulate, compactly built and easily moved to the use site requiring only a source of electric current and discharging without creating mists thereby facilitating interior use without necessity for covering adjacent structures, furniture and the like.

SUMMARY OF THE INVENTION

This invention now provides a portable compact quiet operating device for applying paint to a paint roller or the like applicator supplied through a flexible hose from a portable unit mounting an upright reservoir, and an electric motor driven reciprocating pump over the reservoir with a depending intake tube extending into the reservoir. The electric motor is of the electromagnetic reciprocating type with an armature directly coupled to the piston of the pump. The pump and motor operate very quietly and paint drawn into the pump from the reservoir is discharged under high pressure through a flexible hose to the handle of a hollow wand of a paint roller which contains a trigger actuated valve for manual control of paint flow through the wand to the roller. A carrier or frame has a horizontal base for resting on the floor with a well or recess in the top face thereof for centering a paint can or the like reservoir. An upstanding leg on the base carries a horizontal housing which mounts the electric motor and pump with the pump being disposed over the reservoir to receive paint directly therefrom and to drain paint back to the reservoir. The upstanding leg has a niche or recess snuggly receiving the rear end of the motor housing. The front end of the motor housing mounts the pump housing. The electric motor reciprocates the pump piston which slides in a replaceable cylinder carried by the pump housing. The intake tube from the reservoir is joined through a coupling to a housing inlet that communicates with the pump cylinder and is covered and uncovered as the piston reciprocates. The paint in the cylinder is forced by the piston through a spring loaded check valve and the high pressure paint then discharges to the hose connection with the paint applicator. A pressure relief valve is provided in the pump housing. The top end of the vertical leg of the carrier frame is provided with a handle for ease in lifting the frame for transport to the use site.

It is then an object of this invention to provide a portable paint applying device which does not create contaminating mists and has a floor mounted delivery pump and drive motor so that the painter need only manipulate a light weight paint roller.

Another object of this invention is to provide a quiet operating paint applicator which does not create mists and which has a portable power unit adapted to rest on the floor during use of the applicator.

A further object of the invention is to provide a portable carrier frame or support for a pump operated paint spray roller.

Another object of the invention is to provide an electromagnetic motor and piston pump assembly on an easily carried base frame for supplying paint under pressure to a paint applicator.

A specific object of the invention is to provide a portable frame adapted to rest on the ground and having a lifting handle to facilitate movement to a use source with a paint reservoir removably supported in upright position on the frame, an electric motor driven paint pump mounted on the frame above the reservoir having an intake tube depending into the reservoir and a discharge hose extending from the pump to a paint applicator.

Other and further objects of this invention will be apparent to those skilled in this art from the following description of the annexed sheets of drawings which, by way of a best mode example show a preferred embodiment of the invention.

ON THE DRAWINGS

FIG. 1 is a longitudinal cross sectional view, with part in elevation, of a delivery pump and drive motor mounted in a supporting frame with the pump discharging to a paint roller and with the lower portion of the supporting frame omitted.

FIG. 1*a* is a longitudinal sectional view of the lower part of the supporting frame of FIG. 1.

AS SHOWN ON THE DRAWINGS

Figure 1:
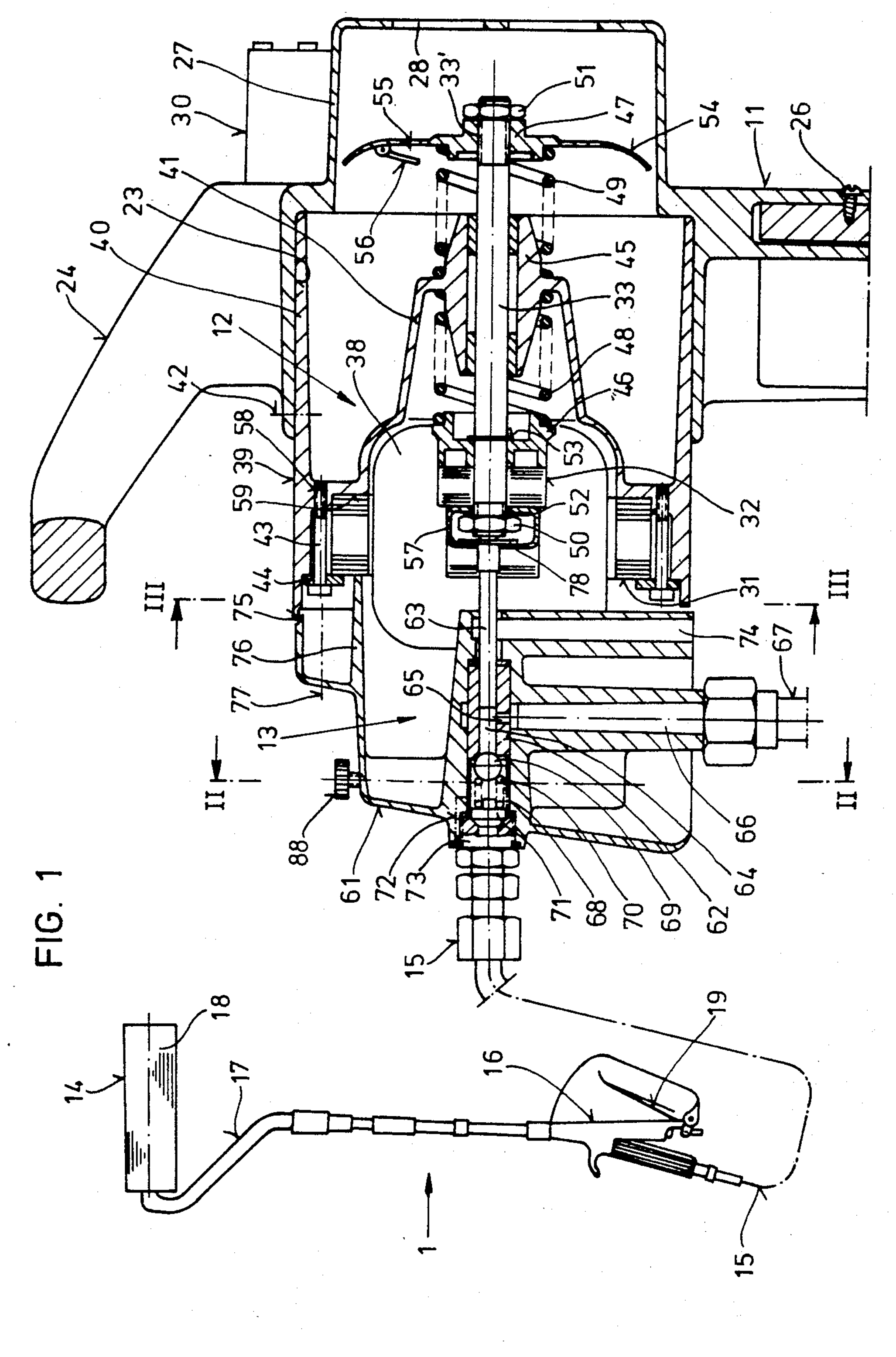
Figure 1A:
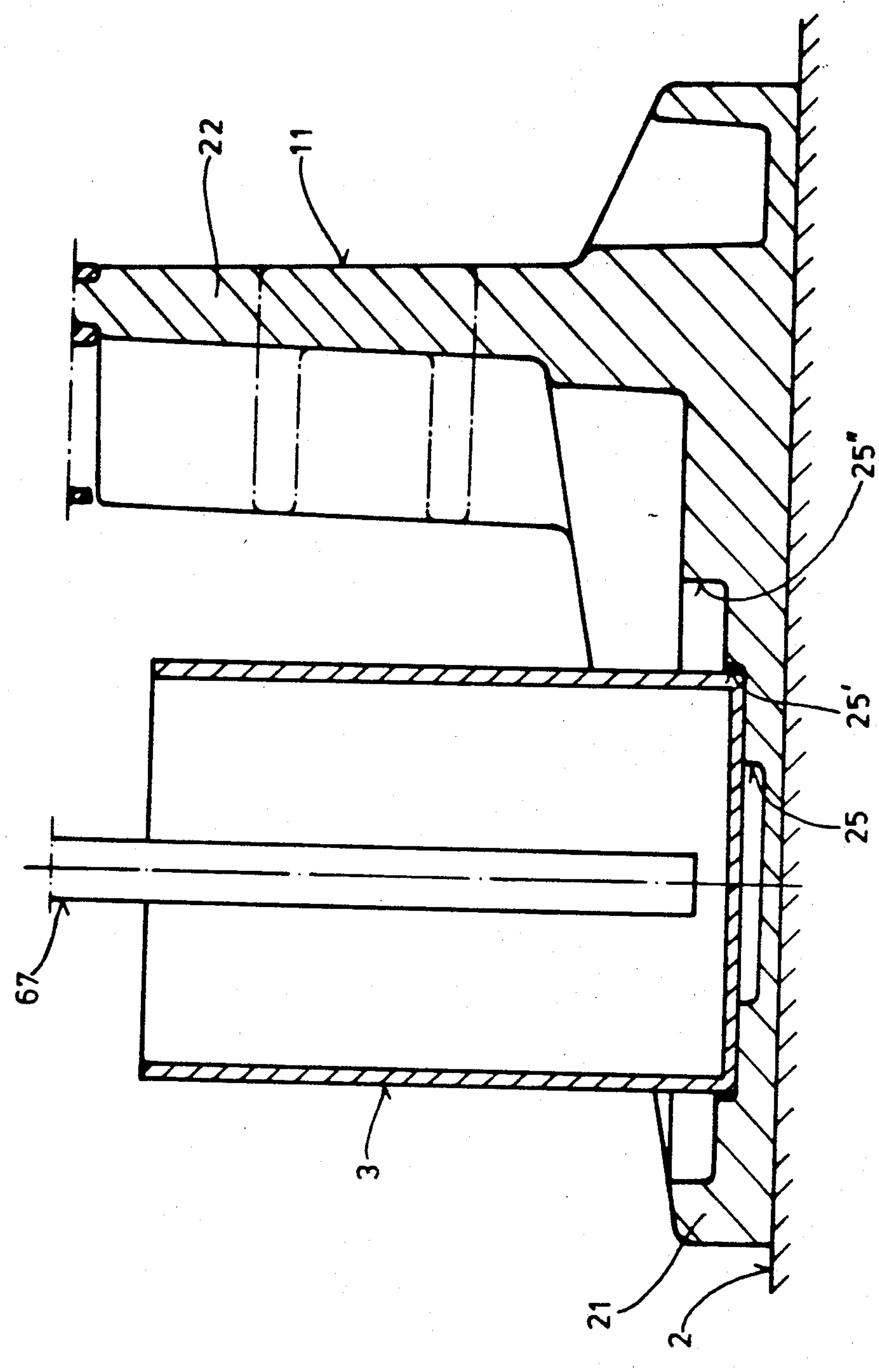

The device for applying paint illustrated in FIG. 1 and referenced 1 consists of a delivery pump 13 arranged vertically above an acceptance reservoir 3 for the paint in a supporting frame 11 which can be placed on the floor, said delivery pump 13 being provided with a drive motor designed as an electric linear motor 12, further consists of an application device 14 and of a high pressure hose line 15 by means of which said application device 14 is connected to the delivery pump 13 over a transition piece 16 provided with a shut-off valve (not illustrated) which can be actuated by means of a trigger 19. The application device 14 is thereby designed as an application roller 18 to which the paint to be applied is supplied from the inside over a line 17 connected to the transition piece 16. Mist formation is thereby reliably avoided so that the device 1 can also be employed without further ado in closed spaces.

The support frame 11 exhibits a base part 21 as well as a vertical leg 22 molded thereto which is designed U-shaped in cross section and is provided with a recess or niche 23 in which the drive motor 12 is placed. Over the niche 23, the vertical leg 22 is designed as a carrying handle 24 so that the support frame 11 can be picked up approximately in the level of the center of gravity.

Depressions 25, 25' and 25" having differently dimensioned horizontal extents are worked into the base 21 which can be rectangular or circular, so that acceptance reservoirs having different sizes can be deposited slip-free on said base 21. The vertical leg 22, further, is subdivided at right angles relative to its longitudinal axis so that the support frame 11 can be disassembled for transport. The inter-pluggable parts of the vertical leg 22 are rigidly connected to one another by means of a screw 26.

Figure 3:
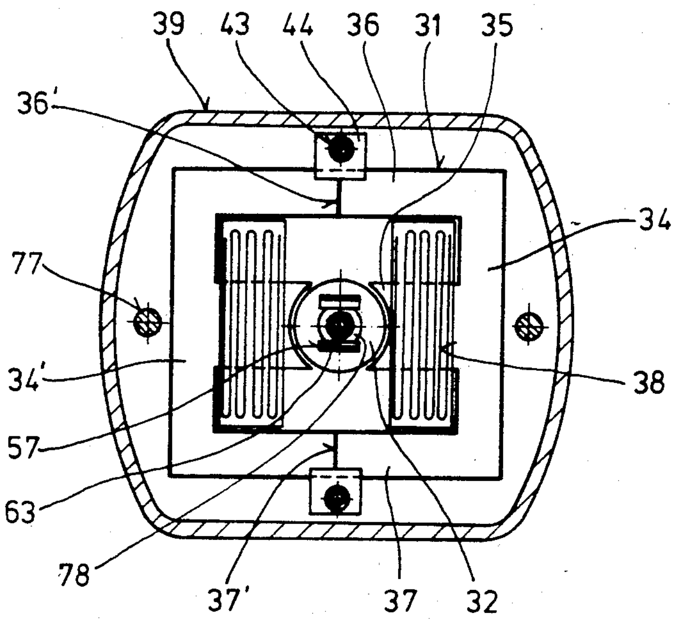
FIG. 3 is a transverse cross sectional view along the line III—III of FIG. 1.

The drive motor 12 of the delivery pump designed as a piston pump is, as already mentioned, designed as an electrical linear motor and exhibits a stator 31 as well as a plunger armature 32 introducible into said stator 31. As can be derived from FIG. 3, the stator 31 thereby consists of coil carriers 34 and 34' designed E-shaped which are disposed with their open sides facing one another. Magnet coils 38 between which the plunger armature 32 can oscillate are held on the center legs 35 of the coil carriers 34 and 34'. In contrast thereto, the upper legs 36 and 37 press flush against one another with their planar end faces 36' and 37' in order to create the flux of the magnetic force lines.

The linear motor 12 is disposed in a motor housing 39 designed W-shaped in cross-section, its outer housing part 40 being inserted into the niche 23 of the support frame 11 and being secured by means of screws 42. In contrast thereto, the stator 31 and the plunger armature 32 are supported at the inwardly projecting inner housing part 41. The fixing of the stator 31 composed of a plate packet is accomplished by means of two draw spindles 43 disposed lying diametrically opposite one another which are screwed into a thread 58 worked into the motor housing 39 and over plates 44, influence the legs 36 and 37 in the area in which these press against one another, so that the stator 31 is pressed against a seating surface 59 provided at the inner housing part 41. Serving, on the other hand, for the support of the axially movable plunger armature 32 is a guide sleeve 45 molded onto the inner housing part 41, a shank-like extension 33 attached to the plunger armature 32 being seated axially displaceable therein. The linear motor 12 functioning with the AC electrical current supply mains can be switched on and off by means of a switch 30 disposed on a cover 27 closing the niche 23 toward the back. The switch 30 has two actuating pins projecting out of the switch housing so that this can be actuated indirectly and protected. It is further appropriate to provide a diode circuit for reducing the current cycle or frequency so that the delivery pump 13 can also be driven with reduced frequency in order, if need be, to be able to undertake a matching to the viscosity of the paint to be conveyed.

Further, two spring plates 46 and 47 are disposed on the extension 33 of the plunger armature 32 at both sides of the guide sleeve 45 and compression springs 48 and 49 by means of which the displacement path of the plunger armature 32 is limited to a certain degree are inserted between said spring plates and the guide sleeve 45. The spring 49 also serves to return the plunger armature 32.

The spring plate 47 held by means of a nut 51 screwed onto a thread 33' of the extension 33 is designed in its outer area as a ventilation valve 54 arced in the direction of the linear motor 12 into which intake openings 55 are worked. The air intake openings 55 are closed by means of movable flaps 56 given a displacement motion of the plunger armature 32 toward the left so that air which has flowed in over openings 28 provided in the cover 27 and the air intake openings 55 is supplied to the linear motor 12 and this, thus, is cooled at every pump stroke given a displacement motion toward the right.

The forces of the springs 48 and 49 are thereby dimensioned such that, given equilibrium, the neutral position of the plunger armature 32 is determined such that this immerses into the stator 31 by 5% through 10% at the side facing away from the delivery pump 13. And, since the position of the spring plate 47 can be infinitely varied by means of the thread 33', the penetration depth of the plunger armature 32 can be easily adjusted.

The delivery pump 13 is built into a separate pump housing 61 which exhibits the interchangeable pump cylinder 62 in which a pump piston 63 is displaceably seated. The pump piston 63 is positively locked in axial direction to the extension 33 carrying the plunger armature 32 by means of U-shaped shackles 57 so that the work motions of the plunger armature 32 produced by the magnetic field flowing from the stator 32 into the plunger armature 32 and its return motions are transmitted to the pump piston 63. With their parallel legs, the shackles 57 thereby embrace plates 52 and 78 attached to the extension 33 and the pump piston 63 so that a potential axial offset can be compensated. The valve disk 46 as well as the plate 52 are held in axial direction by means of a further nut 50 screwed onto the extension 33 and by means of a retaining ring 53.

Figure 5:
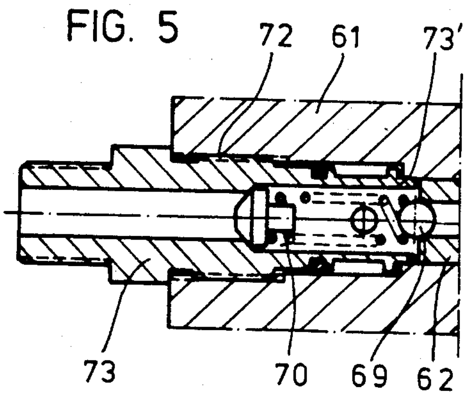
FIG. 5 is an enlarged cross sectional view of the coupling connection at the discharge end of the pump for the high pressure hose line.

The pressure chamber 64 of the delivery pump 13 is connected to the acceptance reservoir 3 over an intake slot 65 worked into the pump cylinder 62, over an intake line 66 molded into the pump housing 61 as well as over an intake hose 67 connected thereto. A check valve 69 whose valve spring 70 is supported against a torsion head 71 is also inserted in the delivery channel 68 of the delivery pump 63. Further, a thread 72 is worked into the pump housing 61 coaxially relative to the pressure chamber 64, a screw connection 73 for connection of the high pressure hose line being secured in said thread 72. The paint emerging from the pressure chamber 64 toward the back is immediately returned into the acceptance reservoir 3 over a return line 74. As can be derived in detail from FIG. 5, the screw connection 73 is provided with projections 73' at its end facing the pump cylinder 62, said projections 73' projecting into the delivery channel 68 of the delivery pump 13 and the pump cylinder 62 being adjustable in the pump housing 61 by means of said projections 73'.

In the area of the centering 75 at which the motor housing 39 presses against the pump housing 61, said pump housing 61 is provided with a support stay 76 by means of which said housing can be additionally clamped and which projects in the direction of the stator 31. To that end, the support stay 76 is likewise pressed against the seating surfaces 39 by means of two screws 77 (only illustrated by means of a center line) which are arranged offset by 90° in comparison to the draw spindles 43.

Figure 2:
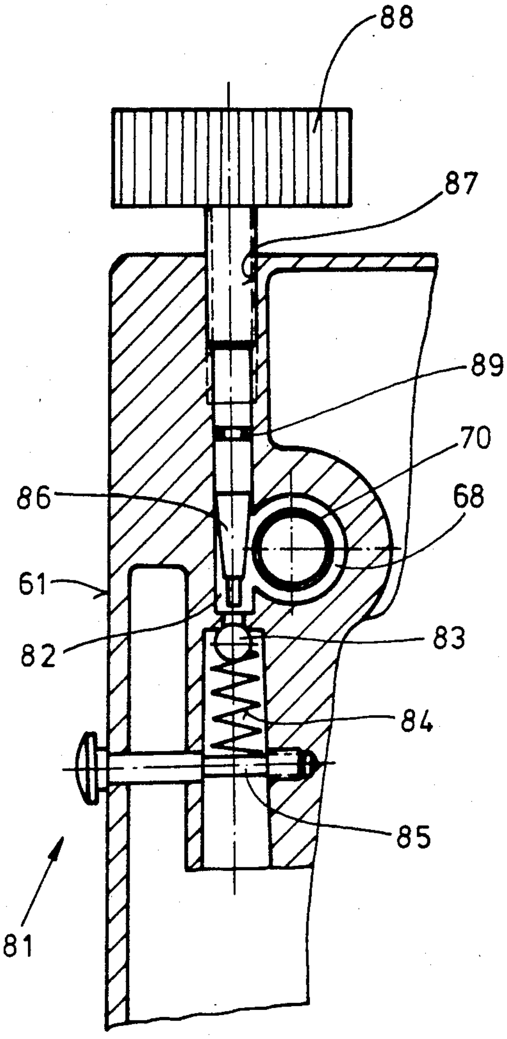
FIG. 2 is a fragmentary cross sectional view, with parts in elevation, of a relief valve for the delivery pump taken substantially along the line II—II of FIG. 1.

For pressure relief, particularly given initial intake and aeration of the pressure chamber 64 of the delivery pump 13, a relief valve 81 which is connected to the delivery channel 68 and is shown in detail in FIG. 2 is allocated to said delivery pump 13. The relief valve 81 thereby consists of a valve body 83 arranged vertically in the channel 82 molded in the pump housing 61 tangentially to the delivery channel 68, a valve spring 84 supported at a pin 85 inserted into the pump housing 61 influencing said valve body 83. The prestress of the valve spring 84, however, is dimensioned such that this withstands the maximum operating pressure of the delivery pump 13 without the valve body 83 being lifted out of its seat.

In order, however, to be able to open the relief valve 81 when needed, a tappet 86 screwed into a thread 87 and having an adjustment knob 88 is provided and can influence the valve body 83. By means of rotating the tappet 86 in which a washer 89 is inserted in order to exclude emergence of the paint toward the top, namely, the valve body 83 can be pressed out of its seat against the force of the valve spring 84 so that a paint circulation from the acceptance reservoir 3 over the delivery pump 13 back into said reservoir can be produced.

When current is supplied to the linear motor 12, then a magnetic field is built up by the magnet coils 38 in accord with the mains frequency, the plunger armature 32 being pulled in by said magnetic field between the legs 35 of the coil carriers 34 and 34' and being in turn repulsed into the initial position illustrated in FIG. 1 by means of the force of the spring 49 which is thereby compressed. And, since the pump piston 63 of the delivery pump 13 is positively locked to the plunger armature 32 over the extension 33, the paint situated in the pressure chamber 64 is pressed into the high pressure hose line 15, and, thus, supplied to the application device 14 at every pump stroke; in contrast thereto, paint is sucked out of the acceptance reservoir 3 into the pressure chamber 64 given the return of the pump piston 63.

Figure 4:
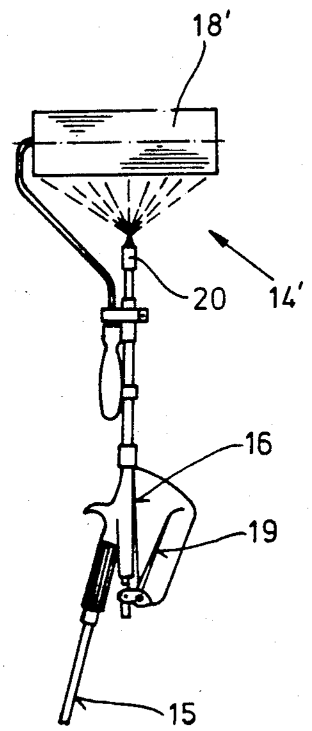
FIG. 4 is an elevational view of a modified paint applicator.

As shown in FIG. 4, an application roller 18' and a spray nozzle 20 attached to the transition piece 16 through which paint is sprayed onto the application roller 18' can also be provided as the application device 14'. Since the distance between the spray nozzle 20 and the application roller 18' remains constant and this acts as an elastic base, paint mists likewise do not thereby occur.

An important feature of this device is the provision of cooling of the linear motor 12 by means of an air impeller. In the embodiment thus far described, the air impeller consists of the spring plate or spring seat 47 which is shown as having radially extending air dam members 54 with ventilation openings 55 therein. Alternatively, the ventilation openings 55 with the associated clack valve 56 can be eliminated by careful control of the dimensioning of the shape and diameter of the air impeller with respect to the internal diameter wall of the housing portion 57. It has been found that proper relative dimensioning of these two members, together with a proper shape of the air impeller will allow sufficient air to be forced around the outer diameter of the air impellor on the backstroke of the linear motor which air is thereafter forced forward past the coils and stators on the next forestroke. To this end, air flow slots may be provided in the front cover 61. It will of course be understood that the housing member 41 will be provided with air flow slots so that air impelled forward by the spring plate impeller will pass through inner housing part 41, past the coils and stators 38 of the linear motor and out the front portion of the housing. In order to assure that the air flow is from the rear towards the front, it is important that the air impeller portions of the spring plate 47 be aerodynamically designed. It has been found that a dish shape will affect the forward air flow desired. By maintaining a close tolerance between the housing part 27 inner diameter and the air impeller outer diameter, coupled with the dish shape of the air impeller, proper air flow can be accomplished. In one embodiment utilizing an air impeller having a 4½" diameter, a clearance of approximately 0.080", when coupled with a properly dished impeller, provides adequate air flow for cooling.

From the above description, it will be clear to those skilled in this art that this invention provides a paint applicator supplied from a portable floor supported unit through a flexible hose thereby easing the manipulation of the applicator and avoiding contaminating paint mists developed with conventional portable paint spray devices. The floor mounted assembly includes a quiet operating electomagnetic motor directly coupled to the piston of a reciprocating pump disposed over a paint receptacle and discharging through a flexible hose to the wand of a paint roller.

We claim as our invention:

1. A paint applying apparatus which comprises a portable frame having a base adapted to rest on the ground and defining a support for removably receiving a paint reservoir in upright position, an upstanding leg on said base adjacent said support, a housing on top of said leg defining a laterally extending recess opening toward said support, a handle on top of said housing above said recess, casing means having one end projected into said recess and supported by said housing and an opposite end projecting beyond the housing overlying the support at a level to accommodate the reservoir freely thereunder, a motor in said casing means, a paint pump driven by said motor in said casing means, a paint intake tube depending from said pump to extend to the bottom of the paint reservoir mounted on the support, a drain from said pump adapted to communicate with the reservoir on the support for draining paint from the pump to the reservoir, a discharge hose extending from said pump, a paint applicator coupled to said hose, and a manually actuated valve controlling paint flow from the hose to the applicator whereby the frame with the paint reservoir on the support of the base is conventiently carried by the handle, placed on the floor adjacent the area to be painted, the motor energized to drive the pump for drawing paint from the reservoir through the intake tube for delivery through the hose to the applicator under control of the valve, and unused paint is drained back to the reservoir.

2. The apparatus of claim 1 including a plurality of nested concentric depressions in the top face of the support for snugly receiving paint reservoirs of different sizes.

3. The apparatus of claim 1 wherein the housing is detachably mounted on top of the leg.

4. The apparatus of claim 1 wherein the casing means is detachably mounted in the recess of the housing.

5. The apparatus of claim 1 wherein the handle on top of the housing is positioned above the center of gravity of the frame.

6. The apparatus of claim 1 wherein said support of the base has a top face large enough to surround the paint reservoir and the leg on the base is spaced beyond said face to avoid obstructing a paint reservoir on the face.

7. The apparatus of claim 1 wherein the casing means is composed of a first casing having one end projected into the recess and mounting the motor therein and a second casing detachably mounted on the projecting end of the first casing and mounting the pump therein.

8. The apparatus of claim 1 wherein the motor is an electromatic linear motor with a reciprocating shaft mounted in a sleeve of the casing means, a motor armature is mounted on the shaft, and a motor stator is mounted in the casing means receiving the armature therein.

9. The apparatus of claim 1 including a relief valve in the pump controlling pressure of the paint, and an externally accessible member regulating the loading of the valve to vary the pump pressure.

10. A paint applying apparatus which comprises a portable frame adapted to rest on the ground, a paint reservoir removably supported in upright position on said frame, an upstanding leg on said frame adjacent said paint reservoir, an electromatic linear motor casing mounted on top of said leg and projecting laterally therefrom toward the paint reservoir, a pump casing mounted on the projecting end of the motor casing at a level spaced above the top of the reservoir, an electromatic linear motor mounted in said motor casing having a reciprocating drive shaft, means for adjusting the stroke of said shaft, a piston pump mounted in said pump casing having a piston directly coupled to said shaft, said pump having an intake communicating with the reservoir, a discharge outlet and a drain communicating with the reservoir, a paint roller having a hollow wand discharging to the roller adapted to be coupled to the discharge outlet of the pump, a manually operated valve on said wand controlling paint flow to said roller, a relief valve in said pump controlling flow from the pump to said drain, and means controlling said relief valve to regulate pressure of the paint at said outlet.

11. The apparatus of claim 10 wherein the motor has a stator formed from a pair of E-shaped coil carriers and a magnet coil is wound around the center legs of these carriers.

12. The apparatus of claim 10 wherein the motor casing is removably mounted on top of said leg and the pump casing is removably mounted on the projecting end of the motor casing.

13. The apparatus of claim 10 wherein the motor casing has an outer cylindrical shell, the top of said leg has a cylindrical housing receiving said shell and an inner concentric cup member in the shell slidably supports the drive shaft.

14. The apparatus of claim 10 wherein the drive shaft is spring biased and an air inpeller disk is adjustably mounted on the end of the shaft to control the spring bias and to reciprocate therewith for flowing air around the motor.

15. An apparatus comprising a housing having a reciprocating linear motor therein the reciprocating linear motor including a reciprocating drive member received through an electric coil member and extending to opposite sides of the coil member, a pump communicating with a paint reservoir and with a means for applying paint supplied by said pump to a surface, a pump piston in said pump coupled to said drive member on one side of the coil member, an air impeller mounted on the drive member at the other side of the coil member, said air impeller projecting radially from the drive member, said housing surrounding said impeller in closely spaced relation, one-way valved air intake openings on said impeller discharging through said impeller to the coil member, and an air intake opening in said housing supplying fresh air through said valved air intake openings as said impeller moves away from said coil member, and said valved air intake openings blocking airflow therethrough as said impeller moves toward said coil member to force said fresh air over said coil member, whereby reciprocation of the drive member drives the pump to pump paint and the impeller to cool the motor.

16. The apparatus of claim 15 wherein the air impeller is dished toward the coil member.

17. The apparatus of claim 15 wherein the air intake openings are controlled by clack valves to close the openings as the impeller moves toward the coil and to open the openings as the impeller moves away from the coil.

* * * * *